United States Patent
Henits (10) Patent No.: US 6,870,920 B2
(45) Date of Patent: Mar. 22, 2005

(54) SYSTEM AND METHOD FOR MULTI-STAGE DATA LOGGING

(75) Inventor: John Henits, Bethel, CT (US)

(73) Assignee: Dictaphone Corp., Stratford, CT (US)

( * ) Notice: Subject to any disclaimer, the term of this patent is extended or adjusted under 35 U.S.C. 154(b) by 0 days.

(21) Appl. No.: 10/187,865

(22) Filed: Jul. 2, 2002

(65) Prior Publication Data

US 2002/0164007 A1 Nov. 7, 2002

Related U.S. Application Data

(62) Division of application No. 09/324,459, filed on Jun. 2, 1999.

(51) Int. Cl.[7] .......................... H04M 3/42; G11B 20/10; G11B 5/09; G06F 15/16
(52) U.S. Cl. ...................... 379/207.02; 360/39; 709/217
(58) Field of Search ...................... 379/207.02; 360/39, 360/5; 709/217, 218, 219; 714/4; 704/200; 705/39

(56) References Cited

U.S. PATENT DOCUMENTS

| | | | |
|---|---|---|---|
| 4,360,854 A | 11/1982 | Schergen et al. ........... 361/149 |
| 5,127,003 A | 6/1992 | Doll, Jr. et al. .......... 370/110.1 |
| 5,163,085 A | 11/1992 | Sweet et al. .................... 379/89 |
| 5,195,128 A | 3/1993 | Knitl ........................... 379/67 |
| 5,199,062 A | 3/1993 | Von Meister et al. .......... 379/67 |
| 5,274,738 A | 12/1993 | Daly et al. ....................... 395/2 |
| 5,392,329 A | 2/1995 | Adams et al. |
| 5,396,371 A | * 3/1995 | Henits et al. ................... 360/5 |
| 5,448,420 A | * 9/1995 | Henits et al. .................. 360/48 |
| 5,457,782 A | 10/1995 | Daly et al. ....................... 395/2 |
| 5,513,312 A | 4/1996 | Loebig |
| 5,535,261 A | 7/1996 | Brown et al. |
| 5,625,890 A | 4/1997 | Swift .......................... 455/67.1 |
| 5,710,978 A | * 1/1998 | Swift ........................ 455/67.11 |
| 5,819,005 A | * 10/1998 | Daly et al. ................... 704/200 |
| 6,014,647 A | * 1/2000 | Nizzari et al. ................. 705/39 |
| 6,122,239 A | * 9/2000 | Bodo et al. .................. 711/111 |

FOREIGN PATENT DOCUMENTS

| | | |
|---|---|---|
| EP | 0 642 250 A2 | 3/1995 |
| EP | 0 642 250 A3 | 1/1999 |
| EP | 0 978 983 A2 | 2/2000 |
| EP | 0 978 983 A3 | 1/2002 |
| WO | WO 91/08572 | 6/1991 |
| WO | WO 97/15007 | 4/1997 |
| WO | WO 98/18283 | 4/1998 |
| WO | WO 98/39901 | 9/1998 |
| WO | WO 99/21336 | 4/1999 |

OTHER PUBLICATIONS

IEEE Communications Magazine, May 1997, "Interacting with Databases in the Global Information Infrastructure" by Tiziana Catarci.*

IEEE Journal, vol. 13, No. 8, Oct. 1995, "Security, Payment, and Privacy for Network Commerce" by B. Clifford Neuman.*

ASC Telecom GmbH, "System DL 2—Digital Voice Logging Unit on DAT–Cassette," Aug. 1992.

(List continued on next page.)

*Primary Examiner*—Benny Tieu
(74) *Attorney, Agent, or Firm*—Jones Day (57) ABSTRACT

A multi-stage data logging system comprising a telecommunications stage for receiving, processing, and compressing data from one or more input channels, a recorder stage for storing said data to a memory device, a distribution stage for retrieving said stored data and distributing said data to one or more output channels, and a plurality of interface paths linking said three stages to one another. Different stages of the system can be located wide distances apart and the interface paths linking the three stages can be automatically switched to achieve fault tolerance of the system.

28 Claims, 5 Drawing Sheets

OTHER PUBLICATIONS

Dictaphone Corporation, "Series 9800 (DAT) Digital Logger—Operator's Manual," Nov. 1992.
Press Release, Dictaphone Coporation, "Digital Audio Tape Logger—Another Dictaphone First," Feb. 1992.
Secure Surveillance Systems, Ltd., "S³ DR 1000—16–32 Channel D.A.T. System".
Press Release, Dictaphone Corporation, "Dictaphone's New ProLog™ Digital Communications Recording System Provides Revolutionary Cost Savings/Playback Features," Jun. 1993.
Magnasync Corporation, Product Information and Brochures for Digital Voice Logger, Jul. 1992.
Racal Recorders, Inc., "Rapid Access Voice Logging Recorder," Oct. 1991.
Racal Recorders, Inc., "RAPIDAX Instant Recall Recorder," Jun. 1992.
Racal Recorders, Inc., "RAPIDAX Ranger Digital Tactical Logging System" Jun. 1995.
Racal Recorders, Inc., "RAPIDAX Ranger—Technical Specification" May 1994.
"Rapidax Ranger Sales Manual (Provisional)".
Nice, "Disk–Based Audio Storage/Retrieval Systems—DSN–1000".
"Voice Logging: Comverse Reports Initial Success for Its New Digital Voice Logging System," Edge, vol. 7, No. 209, p. 18, Jul. 1992.
Atis Assmann GmbH, Systemtechnics Division, "Multi-channel Monitoring and Recording—Overview," 1993.
Eyretel, Ltd., "Voice Recording Solutions".
Eyretel, Ltd., "E–500 16 Channel Digital Voice Recorder".
Eyretel, Ltd., "E1000 Digital Voice Recorder" brochure.
Eyretel, Ltd., "The E1000 Digital Voice Recorder" Information page, www.eyretel.com/E1000.htm, printed Apr. 1997.
Eyretel, Ltd., "An Outline of Eyretel and the E1000 Digital Recorder".
Eyretel, Ltd., Application Bulletin, "Networking Solutions for Eyretel Digital Voice Recorders".
Eyretel, Ltd., Application Bulletin, "Buyers Guide to Digital Voice Recorders for Financial Applications".
Nice Systems Ltd., "Nice–Log for Financial Institutions," brochure, 2 pages.
European Patent Application 0 550 273 A2 (corresponding to reference AK listed above), Dec. 31, 1991.
Patent Abstracts of Japan, Application No. 01267499, Oct. 13, 1989.
"Eventide's Digital Voice Logger," Teleconnect, Jun. 1991, p. 42.
"Questions and Answers: The Eventide VR240 Digital Audio–Logger," Eventide Inc., Mar. 27, 1991.
Racal Recorders, *Wordsafe,* Racal Recorders Inc., Pub. No. 3115–2, Dec. 1990.
TEAC Communications Recorders, CR–320/CR–310, TEAC America, Inc., Aug. 1994.
VR240 Manual, Eventide Inc., Jan. 6, 1992.
Magnasync/Comverse, "DVL 1000" brochure 2 pages.
Magnasync Corp., DVL 1000 Digital Voice Logger brochure, 2 pages.
Comverse/Magnasync, Digital Voice Recording DVL 1000 brochure, 1 page.
Comverse Technology, Inc., Audio Disk Observer brochure, 3 pages, 1991.
Nice Systems, Inc., "Customer Profile: Legal & General," brochure, 2 pages.
Eyretel, Ltd., "Digital Interfacing," brochure, 2 pages.
Sel–Tronics, Inc., "Series E–1000—The Intelligent Recorder," brochure, 2 pages.
Racal Recorders, Inc., "Racal Adds Remote 'Replay Over LAN' to Wordnet Voice–Logging Recorder," Jun. 1996.
Comverse Information Systems, "Section 1: Ultra 3000 System," 2 pages, Jun. 1995.
Siemens, "Data Voice: Digital Voice and Data Memory for Convenient Information Logging," Jan. 1994.
Nice Systems Ltd., "Company Profile," brochure.
Eyretel, Ltd., "Networking," brochure.
PCT International Preliminary Examination Report for PCT. App. No. PCT/US00/15419, mailed Aug. 22, 2002.
Supplementary European Search Report re EP app. No. 00938130, dated May 19, 2003.
"Hicorn Nicelog V7.5," retrieved from Intenet: http://www.siemens.ie/enterprise/apps_solns/pdf/Nicelog.pdf.
"CR–500 Series, Advanced Magneto Optical and DAT Communication Recorders," retrieved from the Internet: ftp://ftp.teac.co.jp/pub/ipd/pdf/English/CR–500E.pdf.
Supplementary partial European Search Report re EP app. no. 00938130.2–2414/US0015419, dated Jan. 7, 2003.

* cited by examiner

SYSTEM AND METHOD FOR MULTI-STAGE DATA LOGGING

This is a division of application Ser. No. 09/324,459, filed June 2, 1999.

FIELD OF THE INVENTION

The present invention relates generally to data logging, and more particularly to a flexible and cost-effective multi-stage system and method for processing multi-channel input data with improved fault tolerance and flexible user access.

BACKGROUND OF THE INVENTION

The efficient storage and retrieval of multi-channel data communications, and especially of voice, are critically important in many modern business and government applications. For example, financial institutions record instructions from clients as a protection against fraud and as evidence in legal proceedings about the content of telephone conversations; public safety agencies record emergency calls for event reconstruction and future investigations; commercial entities monitor transactions over the phone to evaluate salespersons' efficiency, to ensure customer satisfaction and to develop training programs. There is a growing need for reliable recording of multiple channels of multimedia information. These are but a few examples of applications in which it is necessary to efficiently store and process, usually at one location, multiple and frequently simultaneous communications from a large number of incoming data channels. Recent advances in multimedia applications further dictate the necessity to develop practical tools to efficiently process multiple channels in which incoming data can be in different formats, i.e., sound, images, data, etc. It is also apparent that with the proliferation of different communications media, computer platforms and operating systems, a very important practical aspect of all these applications is the ability to provide seamless and efficient interface between the multi-channel data system and its users.

Thus, while capturing the incoming information remains the main function of modern multi-channel data processing systems, other desirable system functions, such as the efficient storage, indexing and retrieval of recorded communications, are becoming increasingly important. Preferably, all system functions should be transparent to the users, regardless of the data format, of the communications media or the specific computer platforms being used. The present invention addresses the need for such a data logging system and method and illustrates their use in practical applications.

Figure 1:
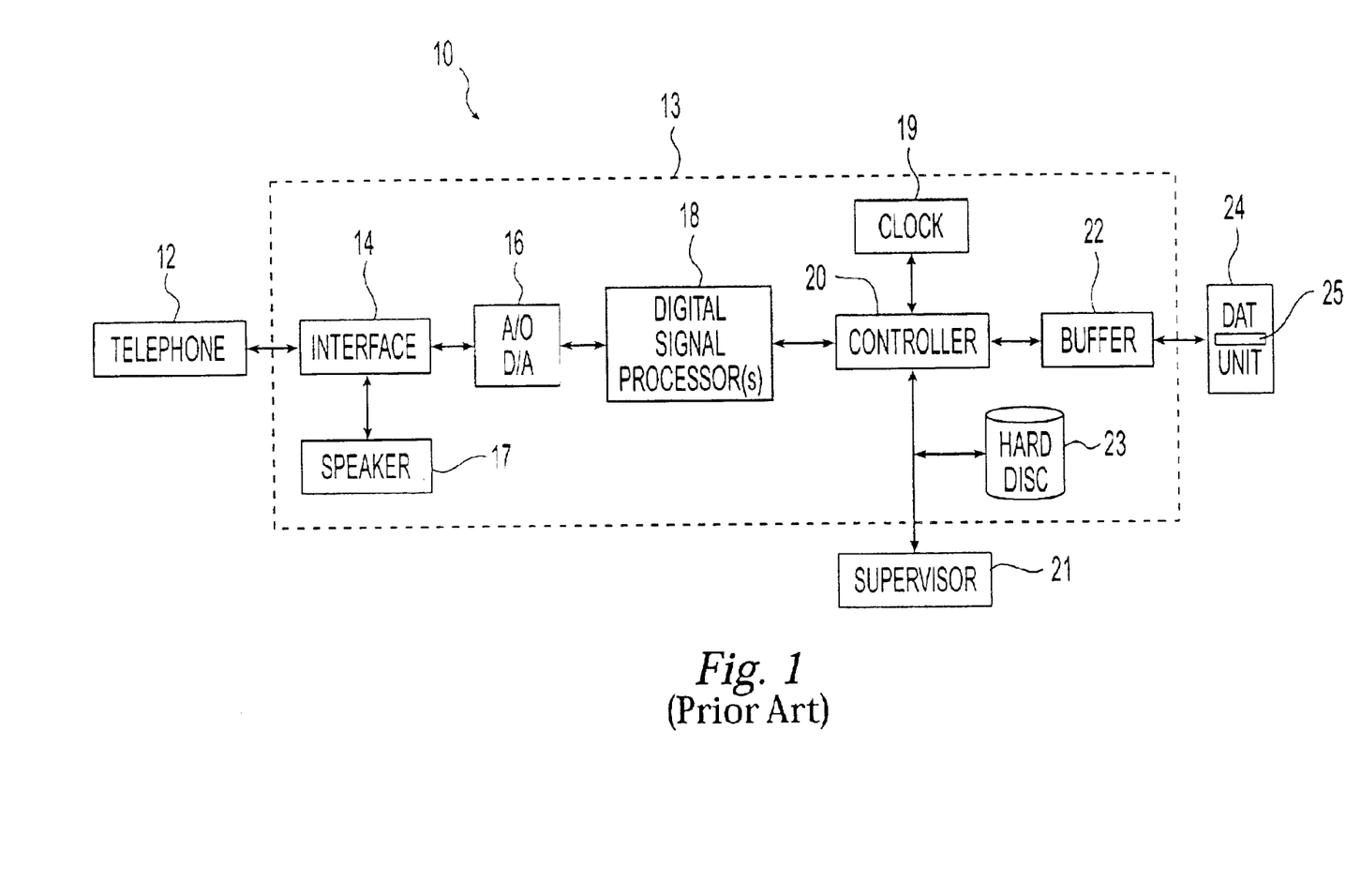
FIG. 1 is a schematic diagram of a data logger of the prior art incorporating multiple logging functions in a single unit.

Data logging systems for capturing and recording massive volumes of data transmitted over multiple communication lines are known in the art. A typical prior art data logging system, such as the one shown in FIG. 1, is implemented as a single physical unit performing most or all required functions, including telephone interface, signal processing, random access buffering, and archive storage. In many practical applications such implementation is perfectly adequate. Examples of such systems are provided in, for example, U.S. Pat. Nos. 5,819,005; 5,448,420; 5,446,603; 5,396,371; 5,339,203 and 4,827,461 to the assignee of the present application. These patents are hereby incorporated by reference for all purposes.

However, as market needs change and performance demands increase, improved logger architectures have to be designed to support expanding capacity requirements and emerging processing needs. Two strong market demands render prior art logger architectures at a disadvantage in this regard: the need to increase the number of input ports, and the need to provide simple and efficient access to the recorded information in platform-and media-independent ways.

Turning first to the input port requirements, modern data logging applications dictate the need to support an ever-increasing number of input channels. It should be apparent that as the number of channels increases so does the complexity of the processing system. The increased complexity in turn creates at least two potential problems: (a) diminished fault tolerance of the system; and (b) practical constraints on the physical design, including the weight and size of the system, its wiring and power requirements, among others.

Increasing the system's complexity generally results in a greater vulnerability and higher risk of data losses because of the increased probability that one or more system components can malfunction. However, people of skill in the art would recognize that in many applications it is critically important that the operation of the system remain error-free. Because of this stringent requirement and the fact that the information that loggers are entrusted to record is almost always original and ordinarily cannot be artificially regenerated, it is necessary to build into the system sufficient redundancy so that the malfunction of one or more components would not lead to a shutdown of the entire system. This in turn makes it increasingly important to devise a scalable system that provides fault tolerant characteristics regardless of the number of input channels.

Fault tolerant architectures that require additional "standby" hardware to replace failed components are known in the art. One such architecture, shown in FIG. 2, utilizes a local area network (LAN) 48 for communication between loggers 44 and controller 46. Each logger is responsible for recording communications on a plurality of input lines. In order to provide backup logging capabilities in the event a logger 44 fails, spare loggers 42 are provided. In particular, each logger 44 is associated with a spare logger 42 that is kept ready for use in the event the working logger 44 fails. This fault tolerant architecture is wasteful and impractical, because it requires more space and twice the hardware (at twice the cost) of a comparable standard logger system.

Figure 2:
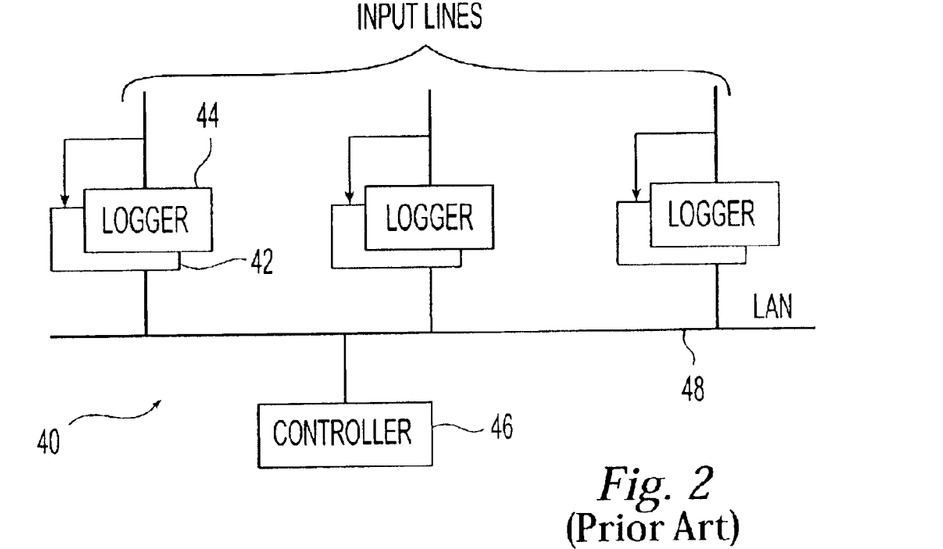
FIG. 2 is a schematic diagram of a logging system of the prior art, employing full operating redundancy where for each working logger there is a spare logger.
Figure 3:
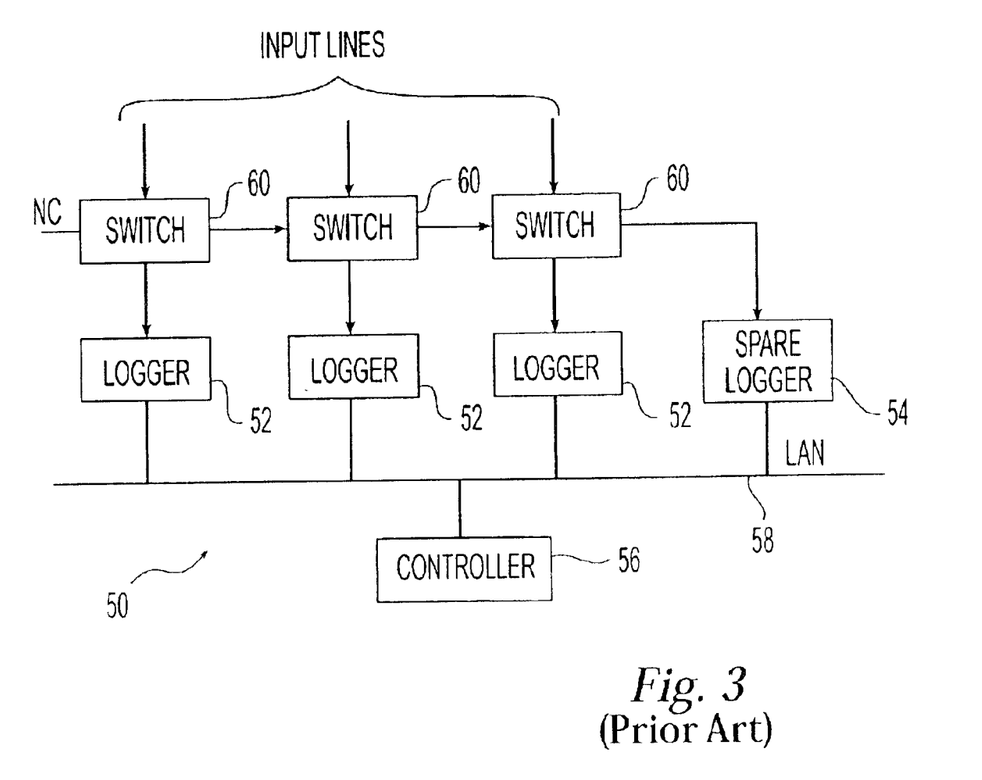
FIG. 3 is a schematic diagram of a logging system of a prior art employing one spare logger for each group of "N" working loggers.

An improved architecture of a fault tolerant system, shown in FIG. 3, is described in an application by Yosef, EP 0822696A2, the content of which is hereby incorporated by reference. The Yosef approach is to use a single spare logger to back up a group of N loggers, thereby reducing the hardware cost in the case when $N \geq 2$ compared with the system shown in FIG. 2. Notably, however, even in this improved prior art architecture the spare unit is a completely functional device capable of performing all logging functions. Accordingly, it does not take advantage of the fact that in operation certain components of the logger fail much more frequently than others. This is the case, for example, in components with physically moving parts, such as hard drives. In accordance with the present invention cost savings are realized for the same fault tolerance level using separation of the logger into two or more functional stages, where higher redundancy is provided for the components having higher failure rates. As illustrated below, using this approach it is possible to reduce the cost of the system considerably, without affecting its performance level.

As mentioned above, the increased complexity of the system also poses wiring, size and other practical problems.

For example, an important consideration when installing a logger with a high number of input channels is the number of wires that interconnect the logger to the PBX. Thus, a logger having 128 input channels requires at least 256 wires. For practical reasons including susceptibility to picking up audible electrical noise over long cable runs, it is desirable to install the logger next to or near the PBX. However, this location may not always be optimal, desirable or even possible in practice. In particular, spatial constraints as well as security issues pose serious problems. Thus, the large size of a high-capacity logger can make it impossible to install it in certain locations. It may further be costly and/or impractical to run massive cable bundles from the PBX room to the loggers. For security reasons it may not even be desirable that the logger is anywhere near the PBX. It should thus be apparent that prior art systems implemented as single physical units suffer from some very serious practical problems. In accordance with the present invention, separation of the logger into several functional stages provides the flexibility to perform different functions at spatially different locations, i.e., in different parts of the same building, city, or the world. In view of the above, the potential advantages of this approach should readily be apparent.

In addition to the requirements for increased capacity, a whole new set of problems is created by the market demand for flexible playback or data access to the stored information. In the context of this application, access to the recorded data is referred to as data "distribution". People of skill in the art will appreciate that it is by no means a trivial task to design a system capable of recording and processing multiple channels of information, while at the same time providing concurrent access to the recorded information from a large number of users. The task becomes even more complex if the users employ different computer platforms.

While many attempts have been made in the past to address these and other problems associated with prior art data logging, no adequate solution has been proposed so far. The system and method of this invention overcome problems associated with the prior art and thus are believed to present significant technological advance. In particular, separation of the logger into several functional stages provides considerable flexibility in designing a functionally and ergonomically optimized system for use in various practical applications. Further, distributing logger functions into separate physical stages leads to significant and unobvious advantages over the existing practice of utilizing a single physical unit. For example, hardware for performing certain functions in the same system can be bulky and thus inconvenient for positioning at a particular location. Due to the functional separation approach of the present invention, however, bulky parts can advantageously be placed where appropriate. Thus, the relatively bulky recording equipment capturing transaction information in the New York Stock Exchange can be placed miles away from the crammed floor of the Exchange. Additionally, in accordance with the principles of the present invention the design of the distribution stage enables users to access the recorded data at their convenience either real-time or at a later point. Importantly, fault tolerance can be provided at a fraction of the cost associated with prior art approaches. The proposed approach provides better system scalability, reliable performance at a low cost and great flexibility in the retrieval of stored information compared with existing designs.

SUMMARY OF THE INVENTION

Accordingly, it is an object of the present invention to provide a multi-stage data logging system that overcomes problems associated with prior art solutions, and helps meet the market demands for increased input capacity, high distribution flexibility and fault tolerance.

In a preferred embodiment, the invention is a multi-stage data logging system comprising: a telecom stage receiving input from a plurality of input channels; a recorder stage having one or more recorders, at least one recorder storing data associated with input received from at least one of said plurality of input channels; a distribution stage providing access to data stored in the recorder stage; a first interface linking the telecom and the recorder stages and a second interface linking the recorder and the distribution stages; wherein at least two stages of the system are physically separable and in operation can be located wide distances apart.

In a specific embodiment the telecom stage of the system further comprises a first interface capturing signals from said plurality of input channels; one or more signal processors converting captured signals into data having a predetermined format; and a second interface for transmitting said converted data to said recorder stage. In embodiments where the input signal can be analog, the telecom stage of the data logging system further comprises at least one analog to digital signal converter.

In specific embodiments, the data logging system of the present invention provides data compression; time stamping of the received input; authentication of signals from the input channels; and encryption of the converted data.

In a preferred embodiment the data logging system of the present invention comprises an archive storage device, part of the recorder and/or telecom stages, for archiving data. In specific embodiments this device can be fixed, such as a RAID array, or removable.

In another preferred embodiment, the recorder stage of the data logging system comprises at least one backup recorder, and the system has means for detecting malfunctions in recorders of the recorder stage, and for automatically switching interface links from the detected malfunctioning recorder to the backup recorders. Related to this embodiment is another aspect of this invention, which is a method for operating a multi-stage data logging system comprising: detecting a malfunctioning recorder in the recorder stage; automatically switching interface links from the detected malfunctioning recorder to a backup recorder to ensure uninterrupted operation of the system; and without disrupting the operation of the system replacing the detected malfunctioning recorder with a functioning recorder.

In yet another aspect, the invention is a method for increasing the capacity of a multi-stage logger system comprising: without disrupting the operation of the system attaching to a network-based or four-wire-based interface between the telecom and the recorder stages at least one recorder so that the combined capacity of the recorders in the recorder stage is equal to or exceeds a given number of channels; and/or attaching at least one additional telecom block to increase the input channel capacity of the system.

In another preferred embodiment, the present invention is a data logger, comprising: a telecommunication device receiving input from a plurality of data sources; a processor converting input from said plurality of data sources to one or more data formats; a memory for storing converted data corresponding to the received input from said plurality of data sources; a communication path; and a server transferring stored data from one or more of said plurality of data sources via the communication path to at least one remote user. In specific embodiments the server is a Web server and the communication path is the Internet.

In another aspect, the present invention is a method for accessing information in at least one digital logger storing data associated with input from a plurality of input channels, comprising: at a Web server having access to said at least one digital logger, receiving a request for retrieval of stored data from a client; retrieving stored data in accordance with the received request; and transferring the retrieved data to the client. In the specific embodiment covering voice input channels, the method further comprises accessing a record of an input channel made by a digital logger; or accessing call information for a record of an input channel made by a digital logger.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

Prior Art

FIG. 1 is a schematic diagram of a prior art data logger 10. Logger 10 incorporates an interface 14 for receiving data from input lines 12, an analog/digital (A/D) and a digital/analog (D/A) signal converter 16 that converts analog signals from input lines 12 into digital signals when data is flowing in one direction and digital to analog when the signal is flowing in the opposite direction. Interface 14 also communicates with a speaker 17. The system further comprises a digital signal processor 18, generally used to compress the digital signals from converter 16; a controller 20, a buffer 22, and hard disc 23. In a typical implementation all components are located in a single physical unit 13. As shown in FIG. 1, the unit may also include a storage unit 24, such as a digital audio tape (DAT). The configuration and operation of a logger of the type illustrated in FIG. 1 is described in detail in several U.S. patents, including U.S. Pat. Nos. 5,819,005; 5,448,420; 5,446,603; 5,396,371; 5,339,203 and 4,827,461 to the assignee of the present application, and which are incorporated herein by reference.

It will be appreciated by people of ordinary skill in the art that the number of input channels that can be handled by a logger of the type shown in FIG. 1 is usually fixed by the design constraints of the physical unit, i.e., by the number and the capacity of the interface cards, the configuration of the processor 18, and others. Accordingly, to process a higher number of input channels it is generally necessary to either increase the number of interface cards (limited by the number of available slots) or duplicate the logger 10 one or more times, such that each unit handles a particular group of incoming channels. In the configuration shown in FIG. 1, as well as multi-logger architectures in which logger 10 is replicated to increase input channel capacity, users may encounter various problems of the type discussed in the background part of this application. For example, failure of one block in logger 10 may disable the entire unit and thus jeopardizes the recording of several input channels. Thus, the fault tolerance of the system depends on its weakest link, i.e., on the most failure-prone component of the unit. In many cases where no backup unit is provided the resulting fault tolerance is unacceptable. Further, space constraints may pose problems because the standard design of the logger 10 as one physical unit does not allow its separation into functional blocks that can be placed in spatially optimal locations.

Reference is now made to FIG. 2, which is a schematic diagram of a prior art fault tolerant data logging system. Data logging system 40 illustrated in FIG. 2 employs one spare logger 42 for each working logger 44. In a particular embodiment, each logger can be implemented as illustrated in FIG. 1 but other embodiments are possible, as known in the art. In this architecture, all loggers are connected via a local area network (LAN) 48 and upon failure of a working logger 44, the spare logger 42 assigned to the failed logger is automatically activated. While just about any fault tolerant system will require some additional "standby" hardware to replace failed components, system 40 illustrated in FIG. 2 requires twice the hardware, at twice the cost, of a conventional system and in most cases is commercially impractical.

Reference is next made to FIG. 3, which is a schematic diagram of an improved fault tolerant data logging system of the prior art. System 50 illustrated in FIG. 3 consists of one or more groups of "N" loggers 52 connected via LAN 58, and linked by a group of "N" switches 60 to a single spare logger 54. When one logger 52 fails, the switches 60 automatically reroute data from the failed logger's input lines to the spare logger 54. For $N \geq 2$ this system requires less "standby"0 hardware than the prior art system of FIG. 2. Nevertheless, it is apparent that such a design is suboptimal, at least because it does not make use of the fact that certain components of the logger are more reliable than others. Importantly, this and other prior art logger designs represent a single-unit design philosophy that carries many performance limitations as noted above.

The Present Invention

In contrast to the prior art designs described above, the approach taken in accordance with the present invention is to combine low-cost and high-reliability multi-stage recorders storing data from multiple input data channels with a powerful distribution technology that enables platform-independent access to the stored data from different physical locations. Multiple channel data recording, and particularly voice loggers, are known in the art. As shown above, some steps have already been taken to improve the reliability of such devices using redundancy approaches. From the distribution perspective in the last few years Internet technology is becoming standard. However, to the best of this inventor's knowledge, there is no suggestion in the past of combining these two paradigms in a multi-stage distributed logger, a next-generation product that brings together the most desirable features of these technologies.

In particular, loggers have been used in the past to record, index and store large volumes of data from different input channels. However, practical limitations, such as their single-unit design, have limited the use of such loggers in many applications. With the distributed multi-stage architecture of the present invention, at least the following advantages over the prior art can be expected:

(a) highly reliable and low-cost data recording and storage due to a novel fault tolerant architecture in which failure-prone components are duplicated for redundancy;

(b) optimized use of space made possible by the physical separation of the logger in separate stages that allow, for example, placing bulky components away from locations where their presence can be inconvenient (due to space limitations), or even highly undesirable (as in covert operations);

(c) improved business models for information distribution.

Figure 4:
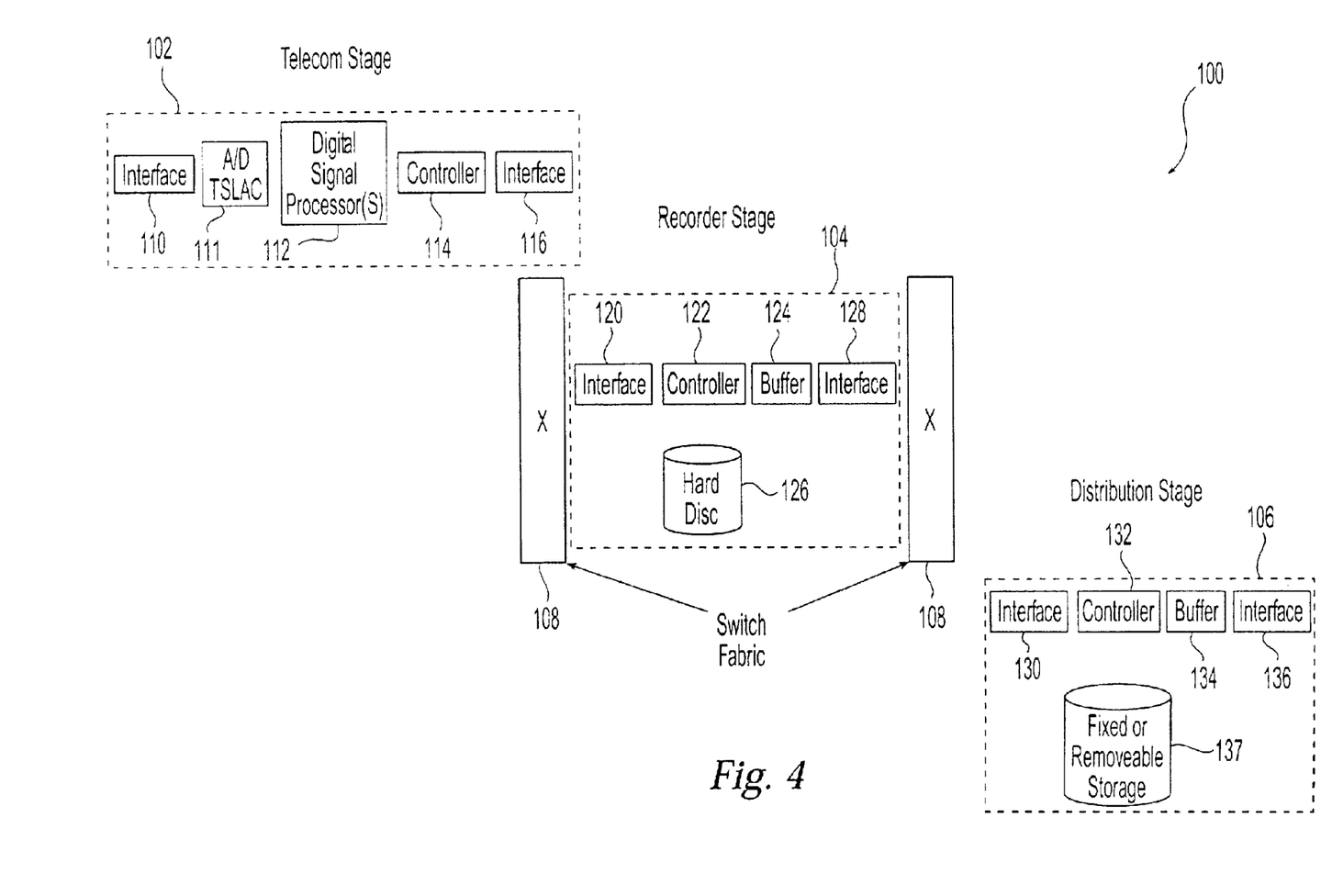
FIG. 4 is a schematic diagram of a multi-stage data logging system in accordance with a preferred embodiment of the present invention.

Reference is now made to FIG. 4, which is a schematic diagram of a multi-stage data logging system in accordance with a specific embodiment of the present invention. In the illustrated embodiment, system 100 consists of a telecommunications stage ("telecom stage") 102, recorder stage 104, and distribution stage 106. Broadly, the telecom stage serves to capture incoming signals, convert the captured signals in a predefined format, preferably digital, and perform certain processing on the converted signals, usually in the nature of compression. Recorder stage 104 stores the processed input signals to a hard drive or similar large-capacity storage device, as well as in a buffer from which the data can be forwarded to fixed or removable storage devices, which in the embodiment shown in FIG. 4 are part of the distribution stage. In accordance with the present invention, the distribution stage serves not only for access to the stored information but also for archiving purposes. Importantly, individual functional stages of the system 100, such as those illustrated in FIG. 4, can be physically separated and typically are housed in separate physical units.

It should be understood that FIG. 4 is merely an illustration of a system built in accordance with the principles of the present invention and should not be construed as a limitation of its design approach. Thus, functional separation of the logger into more than three stages can be desirable in certain applications. In alternate embodiments functional stages can be combined—for example, with reference to FIG. 4, the telecom and recorder stages on one hand, or the recorder and distribution stages on the other hand can be implemented as single physical units. Furthermore, in alternative preferred embodiments data from the recorder stage is made available to users via a communications network such as private communication lines, corporate intranets, the Internet or any combination thereof It will be appreciated that such networks can be accessed by various different computers, so that stage 106 is "distributed" and would have no identifiable physical location.

In another aspect of this invention the stages of the system shown in FIG. 4 are connected using switch fabric 108 interfacing the telecom and recorder stages on one hand, and the recorder stage and distribution stages of the system 100 on the other. It will be appreciated that switch fabric 108 interfacing different stages can be different in design and implementation. In accordance with the present invention, the selection and design of the switch fabric 108 linking the individual stages of the overall system 100 are design parameters that allow for the physical separation of the individual stages in accordance with the preferred embodiments. In particular, dependent on the application, the stages of system 100 can be physically separated so that, for example, the telecom and recorder stages can be located in different parts of the same room, in different rooms of the same building, in different buildings of the same town, in different towns or even different continents. In a specific embodiment such wide spatial separation can be implemented using, for example, standard public switched network access arrangements, dedicated lines, or other communications media, as known in the art. The individual stages of the system in accordance with the present invention are considered in more detail next.

The Telecom Stage

In accordance with the present invention telecom stage 102 generally functions to capture and pre-process signals from a plurality of communications lines into a format that is recognized by the recorder stage. As indicated above, in a preferred embodiment the communication lines could be standard telephone lines, dedicated communication lines or other input data sources, which may transmit analog or digital signals. Regardless of their physical source or data format, in a preferred embodiment the captured input signals are digitized and compressed, as known in the art. Naturally, different types of input data can be transformed into different internal formats, as instructed by the user.

More specifically, as shown in FIG. 4, telecom stage 102 incorporates a first interface 110 for receiving signals from the input lines (not shown), which typically are telephone lines. In accordance with a preferred embodiment, interface 110 is designed for analog or digital input signals, or some combination thereof. When used with telephone lines, interface 110 generally is a high impedance interface that allows for passive tapping of the phone lines. In this embodiment interface 110 employs voltage and/or current sensing to trigger recording of corresponding input channels. External triggering signals can also be used at the telecom stage, as known in the art. In the case of a digital input, interface 110 serves as a digital phone coupler, as known in the art. Various alternate embodiments of the interface 110 are known in the art and are described in detail, for example, in U.S. Pat. No. 4,827,461 to Sander, which is incorporated herein by reference. It will be appreciated that interface 110 can be used for various additional functions, such as beep generation, notching and others.

In the embodiment illustrated in FIG. 4, telecom stage 102 further comprises an A/D signal converter 111 for digitizing the received analog signals. Naturally, no such converter is required for purely digital inputs. Stage 102 also comprises a digital signal processing (DSP) unit 112 for processing signals digitized by converter 111 or supplied directly from digital input channels. In a preferred embodiment, DSP unit 112 is capable of handling various input data types, i.e., voice, image, facsimile and others. In a specific embodiment one processor 112 is capable of handling various input data types and its processing algorithm is selected dependent on the input data type. In alternative embodiments, one processor can be used for each input channel so that different processing algorithms can be applied simultaneously to different input channels. It will be appreciated that whether one or more processors are used, different data compression algorithms can be applied to different input channels dependent on the data type, the statistical distribution of the incoming data, and other factors. Such processing algorithms are generally known in the art and will not be considered in further detail.

Telecom stage 102 illustrated in FIG. 4 further comprises controller 114 that operates to direct and monitor the functions of the entire stage. Specifically, in a preferred embodiment, controller 114 directs the application of a particular processing algorithm by DSP processor 112 to a particular input data type. When instructed by the controller, in a specific embodiment processor 112 is capable of performing DTMF signal detection and decoding, and preferably also performs compression of the data in accordance with well established standards. For example, in the case of voice signal recording, the output of DSP processor 112 is preferably made compatible with the G 723.1 and G 722 voice compression standards, which are known in the art.

In a specific embodiment, interface 110 and A/D converter 111 together with a time slot assignment circuit (not shown) are implemented as a logger coupler card, that places the input data on a pulse code modulation (PCM) highway (not shown) within the telecom stage 102. In this case the DSP unit 112 is directed by the controller 114 to process signals in the appropriate time slots. In particular, controller 114 reads the system clock, directs the assignment of time slots to individual input channels, and provides a time stamp that is used in the creation of individual channel records. As noted above, block 114 also controls the operation of the DSP unit 112 and distributes data compressed at its output to interface 116. In a preferred embodiment an important function of the controller is to reconfigure the processing algorithm(s) of the DSP unit 112 using downloaded software. Thus, in a specific embodiment an input port (not shown) is provided for the controller to download instructions used to re-program the DSP processor(s) 112 from a personal computer (PC).

Finally, in a preferred embodiment telecom stage 102 comprises a second interface 116 for transmitting compressed data to the recorder stage 104. In a specific embodiment the second interface 116 may be an E1 (2 Megabit) transceiver or, for smaller applications, an RS-485 (1 Megabit) line. Other embodiments may be used, as known by those of skill in the art.

In accordance with the present invention, certain functions that are not required but are frequently useful in the operation of data loggers are also provided in specific embodiments. Such functions include, for example, time stamping, encryption and authentication of incoming data. Generally, authentication refers to mechanisms by which the transacting parties prove they are who they claim to be, i.e., in this context that data from an input channel indeed comes from a particular source; encryption usually refers to the altering of data so that it cannot easily be read or modified, if intercepted. If used, such functions should be placed as close as possible to the source of the information that is being captured—and accordingly are implemented in the system of this invention as part of the telecom stage 102. In a specific embodiment, these functions are implemented by the controller block 114. Other functions of the telecom stage can be implemented in specific embodiments, as known in the art. Thus, for example, in a specific embodiment telecom stage 102 can provide lightning protection and can be used to detect DTMF signals, to identify caller IDs, to detect the presence or absence of voice in a particular input channel, and correspondingly control a trigger mechanism for use by the recorder stage 104. As known in the art, the telecom stage can also be used as a current and/or voltage sensor. Functions described in this paragraph can be implemented as part of the logger coupler card used in a specific embodiment, and/or the DSP unit 112 of the telecom stage 102.

Figure 6:
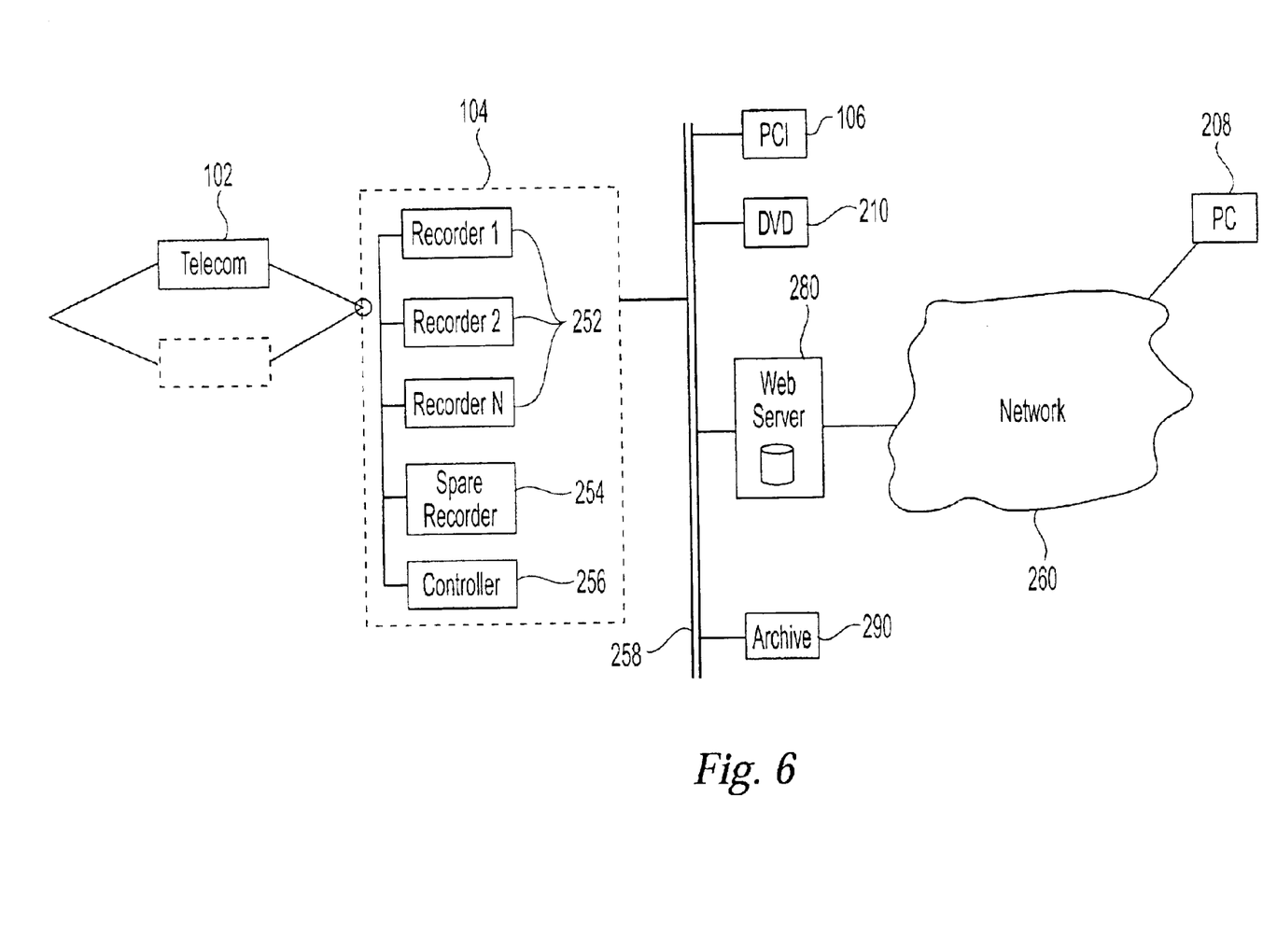
FIG. 6 is a schematic diagram illustrating another preferred embodiment of the multi-stage logger in accordance with the present invention.

It will be appreciated by people of ordinary skill in the art that in general the components of the telecom stage are robust and in particular involve no physically moving parts. Accordingly, in a preferred embodiment, they need not be duplicated in fault-tolerant architectures built using the principles of the present invention. Naturally, in very sensitive applications where there is little or no margin of error the telecom stage can also be duplicated with a standby unit, as shown in FIG. 6. However, in accordance with the present invention, a single standby telecom stage can be used to serve as backup of N recorder stages in a manner similar to that illustrated in FIGS. 3 and 6. The cost savings compared with the architecture shown in FIGS. 2 and 3 are readily apparent.

Finally, since telecom stage 102 is separated from the remaining components of the logger by switch fabric 108, the stage can be implemented in a separate physical unit having as many input channel slots as desired. This compares favorably to the standard single-unit logger design, in which the number of input channels is limited by the number of available slots on the circuit board, which in turn are limited by the overall dimensions of the unit. It will be appreciated that the multi-stage design used in accordance with the present invention thus extends the input channel capacity of the logger.

The Recorder Stage

Again with reference to FIG. 4, recorder stage 104 of the logger stores input from the telecom stage to a hard drive or a suitable large-capacity random access storage device, as well as in a buffer from which the data can be forwarded to fixed or removable storage devices. In a particular embodiment directed to storing voice records, the function of recorder stage 104 can be described broadly as creating voice files and providing an associated database with stored call information. To this end, the recorder stage 104 in a preferred embodiment has the ability to create new voice records, merge call records and establish a database with call information for each created record. In a preferred embodiment, newly created records, along with identifier information are stored in a database at unique record addresses.

In accordance with the embodiment illustrated in FIG. 4, recorder stage 104 has the following components: (a) an interface 120 receiving input from the telecom stage; (b) a controller 122 directing and monitoring the recorder stage operations, and generally comprising a microprocessor with memory; (c) an elastic buffer 124 for transitional data storage; (d) a hard disk or similar large-capacity storage device 126 for data storage (2 Gigabytes minimum); and (e) a second interface 128 for connection to the distribution stage. It will be appreciated that while the components of the recorder stage are illustrated in FIG. 4 as being separate, they need not be implemented in separate physical units.

The function and operation of the recorder stage 104 is generally known in the art. For example, it is described in U.S. Pat. Nos. 5,819,005; 5,448,420; 5,446,603; 5,396,371; 5,339,203 and 4,827,461 to the assignee of the present application, which are hereby incorporated by reference for all purposes. It will be appreciated that alternate embodiments employing different storage media or internal architecture can be used, if necessary. For the purposes of this invention, it is important to note two main differences from prior art designs. The first difference is due to the flexible platform-independent data access provided in accordance with the present invention to end users in the distribution stage. To support such an access, when viewed from the distribution stage the recorder of this invention appears as a file server providing access to a plurality of records (from input data sources) stored in a database at unique record addresses. The server preferably supports different data transfer protocols. The second difference is that since the recorder stage uses moving physical parts and is thus prone to malfunctioning, for high reliability in accordance with this invention it is desirable to provide backup units of the N recorders (or critical components thereof of) the recorder stage. These two aspects of the present invention are described in further detail next.

In accordance with a preferred embodiment, recorder stage 104 has operating system that supports different file access protocols, such as Microsoft's SMB, the UNIX-based NFS and the standard FTP file transfer protocols. Thus, when viewed from the distribution stage 106, the recorder in a preferred embodiment appears as a server supporting these and possibly other file transfer protocols, in which records that correspond to different input channels appear to the user as separate files having unique record addresses. In a preferred embodiment, these files are identified by the call record information and contain, for example, information about the caller ID, the date and time of the communication, its duration, and others. With reference to FIG. 6, a user at a PC 106 connected to the recorder stage via communications path 258 and operating, for example, in a Microsoft Windows environment can click on a "Network Neighborhood" icon on his computer to locate a recorder 202 of interest. As noted above, various records in such a recorder would appear as files that are viewable using Microsoft's SMB protocol. Once a desired record is identified, it can be "dragged" to the user's computer for playback. Similarly, a NFS or Linux client can access files at a recorder that supports the corresponding UNIX-based protocol. Further, file transfers from the recorder can be accomplished over a network 260, such as the Internet, using the well-known FTP protocol. Naturally, security can be implemented at the recorder end, if desired, as known in the art. In each case, it is important that from the viewpoint of the user the recorder stage appears as a server accessing different files organized in such a manner as to provide the user with access to unique records from different input channels.

Focusing next on the fault-tolerant aspect of this invention, FIG. 4 illustrates a recorder stage with a single recorder. As noted above, however, in many practical applications the recorder stage can have two or more recorders, each processing information about a particular set of input channels. Furthermore, in terms of the fault-tolerant aspect of the present invention and with reference to FIGS. 2, 3 and 6, it is noted that unlike the system's telecom stage, the recorder stage typically comprises physically moving parts, and thus is prone to occasional malfunction. Accordingly, in a specific embodiment of the present invention shown in a diagram form in FIG. 6, the recorder stage is implemented in a single physical unit in what is known as a "hot swapping" M×N design. In this design one backup recorder unit 254 is used for every N working units 252, and switchover to the backup unit occurs automatically without turning off the power. In a specific embodiment, N recorders implemented as swappable modules are physically placed in drive bays of a physical unit and can be replaced, if necessary, without turning off the power of the unit. Detection of a recorder malfunction and control over the entire stage is provided by the controller 256, as known in the art. Schematically, the architecture of the fault-tolerant embodiment of the present invention resembles the architecture in FIG. 3, the important difference being that instead of using an entire backup logger, the system of the present invention uses as duplicate hardware merely the recorder stage or components thereof, such as the hard disk 106. Such a design approach not only provides the desired performance level and fault tolerance but also results in considerable savings in terms of the overall system cost.

Providing automatic switchover without disrupting the operation of the system, as described, is an important aspect of the present invention. This feature is made possible by the selection, in a preferred embodiment, of network or 4-wire interfaces linking individual stages of the logger system, which enables inserting or taking out system components without affecting the operation of the entire system. It will be appreciated that the same feature would be difficult to provide with PC bus interfaces. Further, it will be appreciated that this selection of the interface links also makes it possible to incrementally add recording capacity simply by attaching to these links of additional telecom blocks, recorders or both. Clearly, this incremental addition can also be done without interrupting the operation of the system, which feature of the present invention is perceived to have significant practical utility.

The Distribution Stage and Switch Fabrics

In accordance with the present invention a very flexible approach is taken to the design of the distribution stage of the logger. Generally, the distribution stage serves for retrieval of recorded information and providing it in a humanly recognizable form, i.e., as an image, a printout, a sound clip or others. In a preferred embodiment, the distribution stage also serves for archiving the recorded information to a removable storage, such as magnetic tape, magnitooptical storage device, DVD, or others.

As best seen in FIG. 6, in a preferred embodiment the distribution stage may have no single physical location, and in this sense is truly "distributed". As seen in this figure, one or more recorders 252 are attached to a communication path 258. This path can provided using Ethernet, optical fiber or other media. It may be part of a local area network (LAN), a wide area network (WAN), and preferably has access to the Internet. In a specific embodiment, the communication path is implemented as a Universal Serial Bus (USB). It is foreseen that the communication path may also be part of a storage architected network (SAN). As seen from the above list of options, there is no limitation on the type of communication path provided at the back end of the recorder stage, which path concurrently serves as part of switch fabric 108 (see FIG. 4).

With reference to the specific embodiment illustrated in FIG. 4, the distribution stage also has a controller 132 for directing and monitoring distribution stage operations, a buffer 134 for transitional data storage, and a second interface 136 for distributing data to one or more output channels. Distribution stage 106 in the embodiment illustrated in FIG. 4 may also include an archive storage device 137 for archiving data, which can be either fixed (such as a RAID array) or removable. In one embodiment, this archive storage device 137 is a DVD RAM drive, a digital audio tape (DAT), or any suitable device capable of storing large volumes of data from multiple recorders of the recorder stage 104. In an alternate embodiment, the archive drive is part of the recorder stage, not the distribution stage. As seen, in this "OEM-friendly" embodiment, users may be free to design their own customized distribution stage.

With reference to FIG. 6, in a preferred embodiment, the distribution stage is implemented using at least in part Web server design technology. This approach has the advantage of using a powerful distribution tool, which is well known and can readily be employed to support a number of users regardless of their specific computer platforms. In this sense, the Web server 280 acts as an intermediary between one or more recorders 252 in the recorder stage of the logger, and the users accessing the stored information via, for example, the Internet. As noted in the preceding section, in accordance with the present invention the recorder stage will make records from different input channels available as files that are stored at unique record addresses and are made accessible to the Web server 280. In this context it should be noted that in a preferred embodiment the Web server used in the present invention has built-in archiving functions.

In accordance with the present invention Web server 280 may be implemented using any computer, such as, for example, a SUN work station using the UNIX operating system and running a web server program that preferably accepts requests for information framed according to a suitable protocol, such as the HyperText Transport Protocol (HTTP) or a version of it that supports public-key-based authentication or encryption. In response to these requests, Web server 280 accesses the loggers records directly, or it causes a process to access data in a database of the recorder stage through a common gateway interface (CGI); and sends the requested files to the requesting client according to the client's Internet address which, in one embodiment, may be provided according to the Transmission Control Protocol, Internet Protocol (TCP/IP). In a specific embodiment, access to the server can be provided after going through a firewall (not shown) for added security. It will be appreciated that similar distribution scheme can be provided as part of a corporate intranet.

In a specific embodiment employing a Web server as part of the distribution stage users 208 access the Web server through a browser or another suitable application that can playback audio files, in the case of recorded voice information, or display data in a generic case. Specifics of the file formats or data transmission protocols are generally known in the art and need not be described in further detail.

Figure 5:
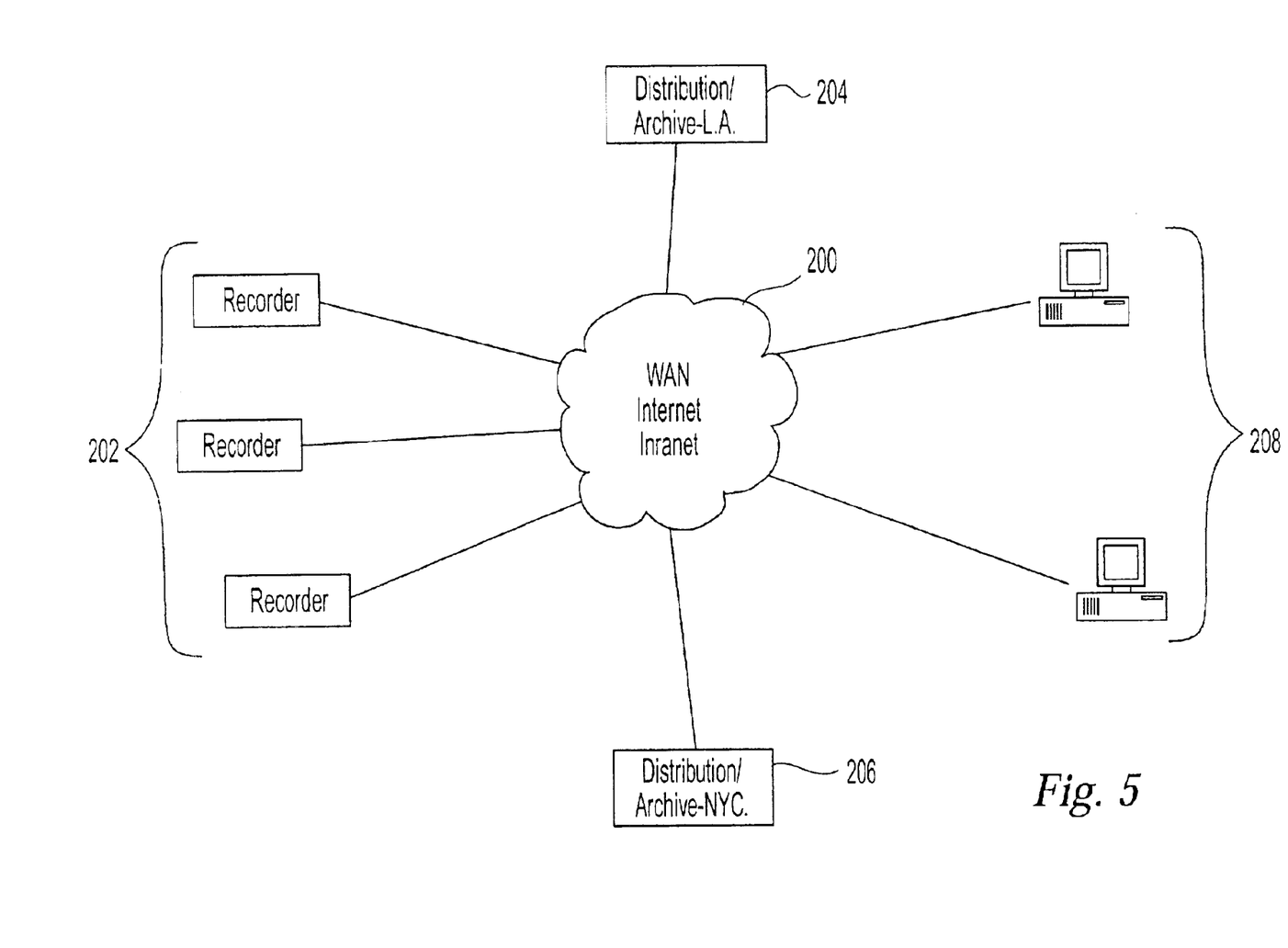
FIG. 5 is a block diagram of a multi-stage logging system configured in accordance with a preferred embodiment of the present invention.

Reference is now made to FIG. 5, which is a block diagram of a multi-stage logging system configured in accordance with a preferred embodiment of the present invention. A wide area network (WAN) 200, such as the Internet or alternatively an Intranet, links a series of recorders 202 located in various different cities, to distribution/archiving engines 204 and 206, located in principal cities like Los Angeles and New York, respectively. A series of user computers 208, possibly located in different cities, is also connected to WAN 200 and can access data recorded by recorders 202 and stored in archive drives 204 and 206. In this configuration, agents located in offices, or even their own homes, in different cities throughout the world can access data logged by equipment physically located thousands of miles away.

As noted above, with reference to FIG. 4 each stage of the logger in accordance with the present invention is designed so that the switch fabric units 108 can be used not only to provide physical separation of the individual stages of the logger, but also to achieve fault tolerance of the system by isolating failed components and switching operation to properly functioning standby units. Numerous configurations are possible, as illustrated in exemplary embodiments above.

Low cost components and switch fabric design also allow for fault tolerant capability in a scalable fashion. To demonstrate the fault tolerant characteristics of a typical configuration, consider a recorder stage comprised of eight working recorders and three "spare" recorders. Assuming a 2 Megabit (4 wire) interface linking the recorder stage with the telecom and distribution stages, the eight recorders would be linked to the three spares via a 32×12 switch matrix ((8 working recorders×4 wires)×(3 spare recorders×4 wires)). In the event of a recorder failure, the recorder controller would route the failed recorder's input to a spare recorder via the switch matrix. The cost savings compared with the case of duplicating entire units are readily apparent.

The advantages of the data loggers built in accordance with the present invention are illustrated in the following examples:

EXAMPLE 1

One of the advantages of the multi-stage distributed logger of the present invention—its design flexibility—is clearly illustrated by its use in stock or commodities exchanges. Financial institutions represented at such exchanges record instructions from clients as a protection against fraud and as evidence in legal proceedings about the content of telephone conversations. Therefore, it is highly desirable that data loggers be provided to record communications between brokers at the exchange floors and their clients. As known, however, there is always a concern about the space on the trading floors. This concern is specifically addressed by the multi-stage design of the logger in accordance with the present invention, in which only the telecom stage electronics would need to be located physically on the trading floor. The recorder stage and various distribution servers of the logger could be located physically either someplace more convenient in the building, or in fact someplace else in the city or the world. For example, an E1 twisted pair interface can stretch approximately 2000 feet, so with available "repeaters" the separation distance between the telecom and the remaining stages is virtually unlimited. Since the voice compression function is performed in a preferred embodiment in the telecom stage, use of the public switched network (or private) facilities would be optimized. Importantly, the telecom stage can apply encryption algorithms so that data coming out of the exchange floor is protected against unscrupulous use. It will be appreciated that the same advantage can be used, for example, by law enforcement agencies that are entitled to have wiretap access to phone lines, but until now did not have a mechanism to protect themselves by encryption from being wiretapped themselves.

Furthermore, it can be appreciated that the multi-stage design of the logger in accordance with the present invention enables considerably simplified disaster recovery procedures, since destruction or simply failure of any single component would not affect the function of the entire system. In addition, since the present invention separates the telecommunications electronics from the recorder, cabling to the recorder can easily be reduced. Such cabling reductions may range from 15:1 to 200:1. The net result is lower installation costs and the satisfaction of any political concerns regarding system location and security.

EXAMPLE 2

In this example it is shown how the multi-stage design of the data logger in accordance with the present invention can be used to create and implement new business models. Assume for example that a data logger is used by a police to monitor 911 calls in a particular area. Information about such calls is generally available to the interested public, for example the news media, but so far has been used in only a few cases primarily because of the difficulties associated with the access to such information. Using the distributed design of a logger in accordance with the present invention, however, it would be a simple matter to make such records available to the public immediately, possibly for a fee.

In particular, a Web server run by the police can store or be given access to data files corresponding to individual 911 calls. With reference to FIG. 6, an authorized user may utilize a personal computer to access the police logger over the world wide web (WWW) of the Internet at a predetermined URL. The user's computer may be running standard web browser, such as the NETSCAPE browser. As soon as the computer is connected to Web server 280 a computer process starts communicating with the user through the web browser. In particular, a service routine may be initiated causing a "home page" to be displayed, which greets the user, and describes the service provided by system. Next, Web server 280 elicits user information, including a user identification (ID), password and other administrative data necessary for ensuring that the user is an authorized user. Next, the audio file(s) corresponding to individual 911 call records can be displayed to the user who can then select a file. As known in the art, various protocols exist for the playback of audio files over the Internet. By means of an example, the user can be provided with a File Header information defining the audio files in fields such as: (1) File name; (2) Date created; (3) Size in bytes; (4) Audio file types in use; (5) Total associated files; (6) a command set code; and others. Additionally, instructions may be provided for decompressing and decoding a specific or proprietary Audio Player software (possibly residing on the Web server), on how to play the files, including hyperlinks, etc. Various levels of access protection can be implemented, as known in the art, so that access hierarchy can be established for different groups of users.

It should be apparent that the use of the logger along the lines described in Example 2 creates the possibility of a completely new and heretofore unused business model.

While the foregoing has described and illustrated aspects of various embodiments of the present invention, those skilled in the art will recognize that alternative components and techniques, and/or combinations and permutations of the described components and techniques, can be substituted for, or added to, the embodiments described herein. It is intended, therefore, that the present invention not be defined by the specific embodiments described herein, but rather by the appended claims, which are intended to be construed in accordance with the following well-settled principles of claim construction: (a) Each claim should be given its broadest reasonable interpretation consistent with the specification; (b) Limitations should not be read from the specification or drawings into the claims (e.g., if the claim calls for "antenna", and the specification and drawings show a coil, the claim term "antenna" should not be limited to a coil, but rather should be construed to cover any type of antenna); (c) The words "comprising", "including", and "having" are always open-ended, irrespective of whether they appear as the primary transitional phrase of a claim or as a transitional phrase within an element or sub-element of the claim; (d) The indefinite articles "a" or "an" mean one or more; where, instead, a purely singular meaning is intended, a phrase such as "one", "only one", or "a single", will appear; (e) Words in a claim should be given their plain, ordinary, and generic meaning, unless it is readily apparent from the specification that an unusual meaning was intended; (f) an absence of the specific words "means for" connotes applicants' intent not to invoke 35 U.S.C. §112 (6) in construing the limitation; (g) Where the phrase "means for" precedes a data processing or manipulation "function," it is intended that the resulting means-plus-function element be construed to cover any, and all, computer implementation(s) of the recited "function"; (h) a claim that contains more than one computer-implemented means-plus-function element should not be construed to require that each means-plus-function element must be a structurally distinct entity (such as a particular piece of hardware or block of code); rather, such claim should be construed merely to require that the overall combination of hardware/firmware/software which implements the invention must, as a whole, implement at least the function(s) called for by the claim's means-plus-function clement(s); (i) a means-plus-function element should be construed to require only the "function" specifically articulated in the claim, and not in a way that requires additional "functions" which may be described in the specification or performed in the preferred embodiment(s); (j) The existence of method claims that parallel a set of means-plus-function apparatus claims does not mean, or suggest, that the method claims should be construed under 35 U.S.C. §112 (6).

We claim:

1. A method for accessing information in at least one digital logger storing data associated with input from a plurality of input channels, comprising:

at a Web server having access to said at least one digital logger, receiving a request for retrieval of stored data from a client;

retrieving stored data in accordance with the received request; and transferring the retrieved data to the client.

2. The method of claim 1 wherein the step of retrieving stored data comprises accessing a record of an input channel made by said at least one digital logger.

3. The method of claim 2 wherein the step of retrieving stored data comprises accessing call information for a record of an input channel made by said at least one digital logger.

4. The method of claim 2 wherein the step of retrieving stored data comprises providing direct access to a record of an input channel stored in said at least one digital logger.

5. The method of claim 1 wherein the step of retrieving stored data comprises causing a process to access data stored in said at least one digital logger through a common gate interface.

6. The method of claim 1 wherein the step of retrieving stored data comprises accessing archived data at the Web server corresponding to a record of an input channel made by said at least one digital logger.

7. A method for accessing information in a digital logging system storing data associated with input from a plurality of communication channels, comprising:

receiving an information request from a user at a network server having access to a plurality of data records created by the logging system, the records corresponding to data transmitted over a communication channel;

providing to the user a description of services offered by the network server;

receiving at the network server an indication of a service selected by the user;

running at the network server of a software routine causing the server to elicit from the user one or more of the following: user information, user ID, authorization level, password and payment information;

in response to the elicited user data providing access to one or more stored records created by the logging system.

8. The method of claim 7, wherein the stored data records have unique record addresses.

9. The method of claim 7, wherein the network server is a Web server.

10. The method of claim 9, wherein the user and the Web server communicate through a web browser.

11. The method of claim 9 wherein the step of providing a description of services is performed by causing a home page associated with the logging system to be displayed.

12. The method of claim 7, wherein the network server is a file server.

13. The method of claim 7, wherein the step of providing access to one or more records comprises providing record information including one or more of: file name, date created, size of the record, audio type files in use, total associated files, and a command set code.

14. The method of claim 13 further comprising the step of providing the user with instructions for decoding playback software.

15. The method of claim 7, wherein at least some data records created by the logging system are archived at the network server.

16. A method for accessing information stored by at least one digital logger storing data associated with input from a plurality of communication channels, comprising:

at a Web server having access to said information stored by at least one digital logger over a communications network, receiving a request for retrieval of stored data from a user;

retrieving said stored data from said information in accordance with the received request; and transferring the retrieved data to the client.

17. The method of claim 16 wherein the step of retrieving stored data comprises accessing a record of a communication channel made by said at least one digital logger.

18. The method of claim 17 wherein the step of retrieving stored data comprises accessing call information for a record of a communication channel made by said at least one digital logger.

19. The method of claim 17 wherein the step of retrieving stored data comprises providing direct access to a record of a communication channel in said information stored by said at least one digital logger.

20. The method of claim 16 wherein the step of retrieving stored data comprises causing a process to access data stored in said at least one digital logger through a common gate interface.

21. The method of claim 16 wherein the step of retrieving stored data comprises accessing archived data at the Web server corresponding to a record of a communication channel made by said at least one digital logger.

22. A method for accessing information in at least one digital logger storing data from a plurality of input channels, comprising:

at a Web server having access to said at least one digital logger, receiving a request from a client for retrieval of stored data from one or more of a plurality of input channels;

retrieving data comprising said stored data in accordance with said received request; and transferring said retrieved data to the client.

23. The method of claim 22 wherein the step of retrieving stored data comprises accessing a record of an input channel made by said at least one digital logger.

24. The method of claim 23 wherein the step of retrieving stored data comprises accessing call information for a record of an input channel made by said at least one digital logger.

25. The method of claim 24 wherein said call information comprises voice data.

26. The method of claim 23 wherein the step of retrieving stored data comprises providing direct access to a record of an input channel stored in said at least one digital logger.

27. The method of claim 22 wherein the step of retrieving stored data comprises causing a process to access data stored in said at least one digital logger through a common gate interface.

28. The method of claim 22 wherein the step of retrieving stored data comprises accessing archived data at the Web server corresponding to a record of an input channel made by said at least one digital logger.

* * * * *

US006870920C1

(12) INTER PARTES REEXAMINATION CERTIFICATE (0087th)
United States Patent
Henits (10) Number: US 6,870,920 C1
(45) Certificate Issued: Aug. 4, 2009

(54) SYSTEM AND METHOD FOR MULTI-STAGED DATA LOGGING

(75) Inventor: John Henits, Bethel, CT (US)

(73) Assignee: Nice Systems, Inc., Rutherford, NJ (US)

Reexamination Request:
No. 95/000,320, Nov. 21, 2007

Reexamination Certificate for:
Patent No.: 6,870,920
Issued: Mar. 22, 2005
Appl. No.: 10/187,865
Filed: Jul. 2, 2002

Related U.S. Application Data (62) Division of application No. 09/324,459, filed on Jun. 2, 1999, now Pat. No. 6,775,372.

(51) Int. Cl.
H04M 3/42 (2006.01)
H04M 7/12 (2006.01)

(52) U.S. Cl. .................... 379/207.02; 360/39; 709/217
(58) Field of Classification Search .................. None
See application file for complete search history.

(56) References Cited

U.S. PATENT DOCUMENTS

| 4,016,540 | A | 4/1977 | Hyatt |
| 4,488,274 | A | 12/1984 | Plunkett |
| 4,597,077 | A | 6/1986 | Nelson et al. |
| 4,630,261 | A | 12/1986 | Irvin |
| 4,634,809 | A | 1/1987 | Paulsson et al. |
| 4,757,497 | A | 7/1988 | Beierle et al. |
| 4,805,172 | A | 2/1989 | Barbe et al. |
| 4,893,301 | A | 1/1990 | Andrews et al. |
| 5,003,574 | A | 3/1991 | Denq et al. |
| 5,133,081 | A | 7/1992 | Mayo |
| 5,200,993 | A | 4/1993 | Wheeler et al. |
| 5,265,075 | A | 11/1993 | Bergeron et al. |
| 5,351,276 | A | 9/1994 | Doll et al. |
| 5,392,329 | A | 2/1995 | Adams et al. |
| 5,488,648 | A | 1/1996 | Womble |

(Continued)

FOREIGN PATENT DOCUMENTS

| CA | 2 217 923 | 4/1999 |
| DE | 41 42 094 A1 | 7/1993 |
| EP | 0 450 610 | 10/1991 |
| EP | 0 637 160 A2 | 2/1995 |
| EP | 0 642 250 A2 | 3/1995 |
| EP | 0 822 696 | 2/1998 |
| EP | 0 837 388 A2 | 4/1998 |
| EP | 0 978 983 | 9/2004 |
| GB | 2 3 17 782 A | 4/1998 |
| JP | 05-324448 A | 12/1993 |
| WO | WO 97/15007 | 4/1997 |
| WO | WO 97/38422 A1 | 10/1997 |
| WO | WO 98/13995 | 4/1998 |
| WO | WO 98/18283 | 4/1998 |
| WO | WO 99/12326 | 3/1999 |

OTHER PUBLICATIONS

Racal Adds Remote Replay Over LAN to Wordnet Voice-Logging Recorder, dated Jun. 17, 1994.

(Continued)

*Primary Examiner*—Ovidio Escalante (57) ABSTRACT

A multi-stage data logging system comprising a telecommunications stage for receiving, processing, and compressing data from one or more input channels, a recorder stage for storing said data to a memory device, a distribution stage for retrieving said stored data and distributing said data to one or more output channels, and a plurality of interface paths linking said three stages to one another. Different stages of the system can be located wide distances apart and the interface paths linking the three stages can be automatically switched to achieve fault tolerance of the system.

U.S. PATENT DOCUMENTS

| | | | |
|---|---|---|---|
| 5,524,147 | A | 6/1996 | Bean |
| 5,533,103 | A | 7/1996 | Peavey et al. |
| 5,559,875 | A | 9/1996 | Bieselin et al. |
| 5,623,540 | A | 4/1997 | Morrison et al. |
| 5,668,863 | A | 9/1997 | Bieselin et al. |
| 5,740,231 | A | 4/1998 | Cohn et al. |
| 5,751,961 | A | 5/1998 | Smyk |
| 5,799,063 | A | 8/1998 | Krane |
| 5,812,644 | A | 9/1998 | Bowater et al. |
| 5,828,730 | A | 10/1998 | Zebryk et al. |
| 5,864,616 | A | 1/1999 | Hartmeier |
| 5,905,775 | A | 5/1999 | Polcyn |
| 5,930,341 | A | 7/1999 | Cardillo et al. |
| 5,945,989 | A | 8/1999 | Freishtat et al. |
| 5,982,857 | A | 11/1999 | Brady |
| 5,999,965 | A | 12/1999 | Kelly |
| 6,014,437 | A | 1/2000 | Acker et al. |
| 6,052,454 | A | 4/2000 | Kek et al. |
| 6,122,357 | A | 9/2000 | Farris et al. |
| 6,122,364 | A | 9/2000 | Petrunka et al. |
| H1918 | H | 11/2000 | Hoffpauir et al. |
| 6,222,838 | B1 | 4/2001 | Sparks et al. |
| 6,230,197 | B1 | 5/2001 | Beck et al. |
| 6,233,318 | B1 | 5/2001 | Picard et al. |
| 6,266,400 | B1 | 7/2001 | Castagna |
| 6,311,186 | B1 | 10/2001 | MeLampy et al. |
| 6,385,642 | B1 * | 5/2002 | Chlan et al. .................. 709/203 |
| 6,385,646 | B1 | 5/2002 | Brown et al. |
| 6,493,434 | B1 | 12/2002 | Desmond et al. |
| 6,535,586 | B1 | 3/2003 | Cloutier et al. |
| 6,587,871 | B1 | 7/2003 | Schrader |
| 6,724,875 | B1 | 4/2004 | Adams et al. |
| 6,850,609 | B1 | 2/2005 | Schrage |
| 7,051,182 | B2 | 5/2006 | Blumenau et al. |
| 7,092,494 | B1 | 8/2006 | Anders et al. |
| 2001/0043697 | A1 | 11/2001 | Cox et al. |
| 2002/0075587 | A1 | 6/2002 | Tsurumaki et al. |
| 2002/0080927 | A1 | 6/2002 | Uppaluru |
| 2003/0009464 | A1 | 1/2003 | Campbell et al. |
| 2003/0191970 | A1 | 10/2003 | Devine et al. |
| 2006/0253627 | A1 | 11/2006 | Minakata et al. |

OTHER PUBLICATIONS

A Recording and Processing System for Accounting and Traffic Analysis on a Large PABX, Myskja, A., IEEE Transaction on Communications vol. 19, Issue 5, Part 1, Oct. 1971.

An Overview Of The Etherphone System And Its Applications, Zellweger, P.T., Terry, D.B., Swinehart, D.C., Computer Workstations, 1988, Proceedings of the 2nd IEEE Conference on Mar. 7–10, 1988 pp. 160–168.

Data Logging: A Method For Efficient Data Updates in Constantly Active Raids, Gabber, E., Korth, H.F., Data Engineering, 1998 Proceedings, 14th International Conference, Feb. 23–27, 1998, pp. 144–153.

Establishing the Value of Voice Communication with Computers, Lea, W., Audio and Electroacoustics, IEEE Transactions on vol. 16, Issue 2, Jun. 1968, pp. 184–197.

Racal Adds Remote Replay Over LAN to Wordnet Voice–Logging Recorder, dated Jun. 17, 1996.

Standardization On Multimedia Communications: Computer–Telephony–Integration–Related Issues, Asatani, K., Communications Magazine, IEEE vol. 36, Issue 7, Jul. 1998, pp. 105–109.

Why Optimistic Message Logging Has Not Been Used In Telecommunications Systems, Yennun Huang, Yi–Min Wang, Fault–Tolerant Computing, 1995, FTCS–25, Digest of Papers, Twenty–Fifth International Symposium, Jun. 27–30, 1995, pp. 459–463.

Communication pursuant to Article 94(3) EPC dated Jun. 30, 2006 in connection with EP 06 004 938.4 (pending EP case in family).

Response to communication pursuant to Article 96(1) EPC filed Aug. 13, 2007 in connection with EP 06004938.4 (pending EP case in family).

European Search Report and Search Opinion dated Jun. 6, 2006 in connection with EP 06 044 938.4 (pending EP case in family).

* cited by examiner

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1–28 are cancelled.

* * * * *